United States Patent
Deng et al.

(10) Patent No.: US 9,056,799 B2
(45) Date of Patent: Jun. 16, 2015

(54) MATRIX POWDER SYSTEM AND COMPOSITE MATERIALS AND ARTICLES MADE THEREFROM

(75) Inventors: Xin Deng, Rogers, AR (US);
Debangshu Banerjee, Springdale, AR (US); Michael Wilfert, Mistelgau (DE)

(73) Assignee: Kennametal Inc., Latrobe, PA (US)

( * ) Notice: Subject to any disclaimer, the term of this patent is extended or adjusted under 35 U.S.C. 154(b) by 759 days.

(21) Appl. No.: 12/953,609

(22) Filed: Nov. 24, 2010

(65) Prior Publication Data

US 2012/0125694 A1  May 24, 2012

(51) Int. Cl.
*E21B 10/46* (2006.01)
*C04B 35/56* (2006.01)
*C22C 29/06* (2006.01)

(52) U.S. Cl.
CPC ......... *C04B 35/5607* (2013.01); *C04B 35/5611* (2013.01); *C04B 35/5622* (2013.01); *C04B 35/5626* (2013.01); *C22C 29/06* (2013.01); *C04B 2235/3839* (2013.01); *C04B 2235/3843* (2013.01); *C04B 2235/3847* (2013.01); *C04B 2235/40* (2013.01); *C04B 2235/404* (2013.01); *C04B 2235/405* (2013.01); *C04B 2235/407* (2013.01); *C04B 2235/42* (2013.01); *C04B 2235/421* (2013.01); *C04B 2235/428* (2013.01);
(Continued)

(58) Field of Classification Search
CPC ...... E21B 10/46; C22C 29/08; C04B 35/5626
USPC .................................. 175/327, 425
See application file for complete search history.

(56) References Cited

U.S. PATENT DOCUMENTS 3,395,030 A   7/1968  Dittrich
4,744,943 A   5/1988  Timm
(Continued)

FOREIGN PATENT DOCUMENTS

CA   1109895       9/1981
CN   1042192 A    5/1990
(Continued)

OTHER PUBLICATIONS

Lee et al, "Sintering of nano-sized WC-Co powders produced by a gas reduction-carburization process", Journal of Alloys and Compounds, Dec. 5, 2005, pp. 281-289, vol. 419 issues 1-2, Elsevier B.V. (online), Amsterdam.
(Continued)

*Primary Examiner* — Kenneth L Thompson
(74) *Attorney, Agent, or Firm* — Matthew W. Gordon

(57) ABSTRACT

The present invention includes a matrix powder system comprising one or more polycrystalline carbides, binderless carbides, or a combination thereof, a composite comprising the matrix powder system and a metal bond phase, a matrix bit body for a drill bit for oil and gas drilling made of this composite material, and a drill bit for oil and gas drilling comprising the matrix bit body and at least one cutter. The polycrystalline and/or binderless carbides may comprise carbides of W, Ti, V, Cr, Nb, Mo, Ta, Hf, Zr, or a combination thereof. The binderless carbides have less than 3 wt. % binder and the binderless and/or polycrystalline carbides may have a grain size of $\leq 15$ µm and a hardness of $\geq 1900$ HV (0.5 kgf). Additional ceramic components and/or metals may also be present in the matrix powder system. Alternatively, the composite material may be present on only a portion of the matrix bit body surface.

13 Claims, 2 Drawing Sheets

(52) U.S. Cl.
CPC . *C04B 2235/5436* (2013.01); *C04B 2235/5445* (2013.01); *C04B 2235/80* (2013.01); *C04B 2235/96* (2013.01)

(56) References Cited

U.S. PATENT DOCUMENTS

| | | | |
|---|---|---|---|
| 4,884,477 A * | 12/1989 | Smith et al. | 76/108.2 |
| 4,923,512 A | 5/1990 | Timm et al. | |
| 4,945,073 A | 7/1990 | Dubensky et al. | |
| 5,256,608 A | 10/1993 | Dubensky et al. | |
| 5,334,561 A | 8/1994 | Matsui et al. | |
| 5,368,812 A | 11/1994 | Calka et al. | |
| 5,563,107 A | 10/1996 | Dubensky et al. | |
| 5,589,268 A | 12/1996 | Kelley et al. | |
| 5,612,264 A | 3/1997 | Nilsson et al. | |
| 5,681,783 A | 10/1997 | Nilsson et al. | |
| 5,733,649 A | 3/1998 | Kelley et al. | |
| 5,733,664 A | 3/1998 | Kelley et al. | |
| 5,786,076 A * | 7/1998 | Ederyd et al. | 428/325 |
| 5,996,714 A * | 12/1999 | Massa et al. | 175/413 |
| 6,030,912 A * | 2/2000 | Yamamoto et al. | 501/87 |
| 6,044,920 A * | 4/2000 | Massa et al. | 175/417 |
| 6,065,552 A * | 5/2000 | Scott et al. | 175/374 |
| 6,240,235 B1 | 5/2001 | Uno et al. | |
| 6,287,360 B1 | 9/2001 | Kembaiyan et al. | |
| 6,299,658 B1 * | 10/2001 | Moriguchi et al. | 51/307 |
| 6,353,771 B1 * | 3/2002 | Southland | 700/197 |
| 6,617,271 B1 * | 9/2003 | Kodash et al. | 501/87 |
| 6,682,580 B2 | 1/2004 | Findeisen et al. | |
| 6,684,967 B2 | 2/2004 | Mensa-Wilmot et al. | |
| 6,843,824 B2 | 1/2005 | Anderson | |
| 7,475,743 B2 | 1/2009 | Liang et al. | |
| 8,173,561 B2 | 5/2012 | Peterson et al. | |
| 2004/0026132 A1 * | 2/2004 | Hall et al. | 175/427 |
| 2007/0056776 A1 | 3/2007 | Overstreet | |
| 2007/0240910 A1 | 10/2007 | Kembaiyan et al. | |
| 2007/0251732 A1 * | 11/2007 | Mirchandani et al. | 175/393 |
| 2008/0206585 A1 | 8/2008 | Deng et al. | |
| 2008/0302577 A1 * | 12/2008 | Pile | 175/427 |
| 2009/0097788 A1 * | 4/2009 | Cooley et al. | 384/107 |
| 2010/0320004 A1 * | 12/2010 | Deng et al. | 175/426 |
| 2011/0195834 A1 * | 8/2011 | Banerjee et al. | 501/93 |

FOREIGN PATENT DOCUMENTS

| | | |
|---|---|---|
| CN | 1481345 A | 3/2004 |
| CN | 1609053 A | 4/2005 |
| CN | 102503426 A | 6/2012 |
| EP | 0154936 B1 | 5/1990 |
| JP | 51-64408 | 12/1974 |
| JP | 2003-048004 A | 2/2003 |
| JP | 2003-81649 | 3/2003 |
| JP | 2008-094670 A | 4/2008 |
| WO | WO 2005023729 A1 * | 3/2005 |

OTHER PUBLICATIONS

Office Action dated Jul. 30, 2014 with attached Search Report.

* cited by examiner

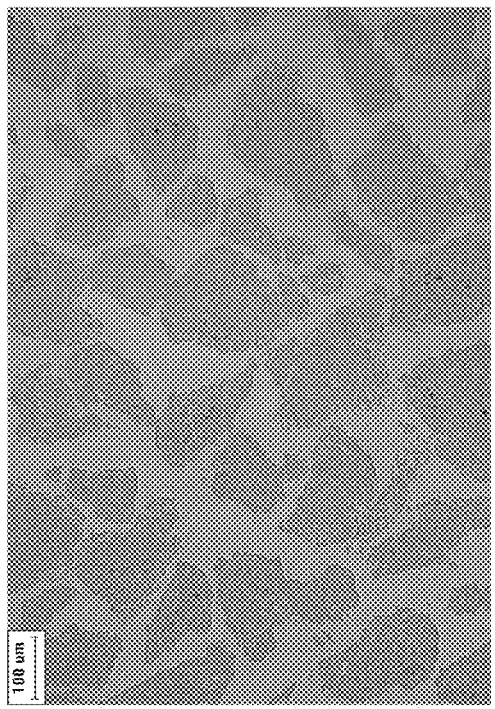
FIG. 2C - WC-Co Pellet infiltrated with Cu alloy
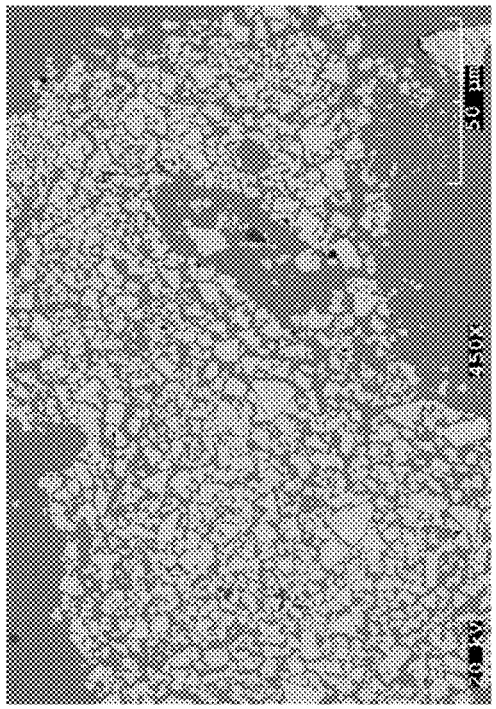
FIG. 2D - WC-Co Pellet infiltrated with Cu alloy
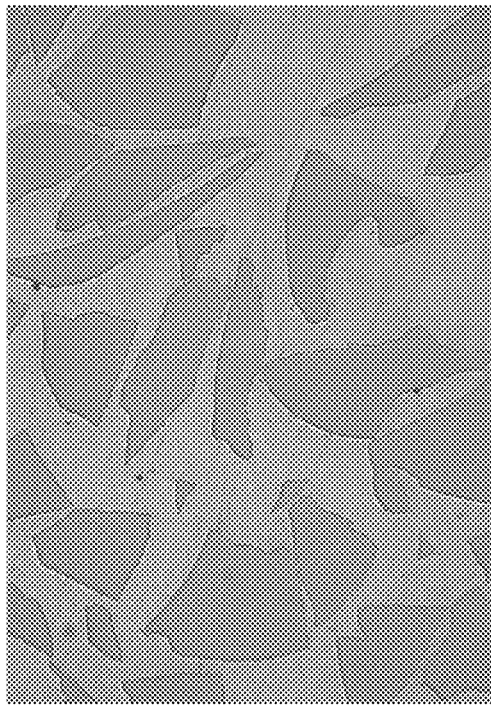
FIG. 2A - Binderless WC infiltrated with Cu alloy
FIG. 2B - Binderless WC infiltrated with Cu alloy

MATRIX POWDER SYSTEM AND COMPOSITE MATERIALS AND ARTICLES MADE THEREFROM

BACKGROUND OF THE INVENTION

1. Field of the Invention

The present invention relates to a matrix powder system, a composite material including the matrix powder system, and a matrix bit body made of such a composite material for a drill bit used for oil and gas drilling. More specifically, the present invention relates to a matrix powder system that includes one or more polycrystalline carbides, binderless carbides, or a combination thereof, said polycrystalline and/or binderless carbides comprising carbides of W, Ti, V, Cr, Nb, Mo, Ta, Hf, Zr, or a combination thereof.

2. Description of Related Art

An earth-boring drill bit 1 used for oil and gas drilling, as shown in FIG. 1, includes several cutting elements 2 which are attached to a drill bit body 4. Drill bits of this type may also be referred to as shear bits, shear matrix body cutters, or matrix body drill bits. The drill bit body 4 is made of a composite having a hard matrix phase that contains one or more ceramic components, such as cast tungsten carbide, macrocrystalline tungsten carbide, agglomerate carburized tungsten carbide, crushed cemented tungsten carbide, tungsten carbide-cobalt/nickel pellets, and/or other carbides, nitrides, borides, and/or oxides in the form of small particles.

The cutting elements 2 are most commonly discrete diamond or polycrystalline diamond composites on a cemented carbide substrate attached to the drill bit body 4 by brazing or by a mechanical/metallurgical bond with the drill bit body material.

Commonly, the matrix material drill bit body is manufactured using an infiltration process which bonds the small matrix particles using a metal bond phase. In the infiltration process, a matrix powder is poured into a mold. The infiltration metal, which will become the metal bond phase of the composite, is then placed on top of the matrix powder. After the mold is loaded, a top is positioned over the mold and the mold is heated in a furnace to a temperature above the melting point of the metal bond phase but below the melting point of the ceramic components of the matrix powder. The metal bond phase melts and infiltrates the matrix powder. After cooling and solidification, the metal bond phase bonds the matrix powder together to form a solid composite. A steel shank is either bonded to the drill bit body 4 after solidification or placed in the mold prior to heating, such that the infiltrate metal bonds the shank to the drill bit body 4. The cutters 2 are attached to the drill bit body 4 after solidification using brazing or another suitable attachment method to secure them in grooves or recesses formed in the drill bit body 4 by the mold.

U.S. Pat. No. 7,475,743 to Liang et al. describes an earth-boring drill bit having a matrix bit body containing cemented tungsten carbide and cast tungsten carbide manufactured using the infiltration method. In the Liang patent, the cutting elements are brazed to the matrix bit body after it has been manufactured using the infiltration method. United States Patent Application Publication No. 2008/0206585 to Deng et al. describes a drill bit having a matrix bit body containing carbides, borides, nitrides, and/or oxides manufactured using the infiltration method.

During the infiltration process used to manufacture the matrix material drill bit body, temperatures reach about 1200° C. It is, therefore, necessary for the matrix components, i.e., the carbides, to have good thermal stability so that they do not break down during the manufacturing process.

During operation, such earth-boring drill bit bodies are subjected to a significant amount of erosion and impact. Although the cutters 2, which are made of diamond or polycrystalline diamond composites, have high hardness and good erosion resistance in service, the currently used drill bit bodies 4 are less erosion resistant. As a result, the limiting factor for the life of the drill bit is the degradation of the drill bit body 4.

Therefore, a composite material is needed for the drill bit body 4 that contains a matrix powder system having better thermal stability to tolerate the manufacturing process and higher hardness and better erosion resistance to more closely match the hardness and erosion resistance of the cutters 2.

SUMMARY OF THE INVENTION

The present invention is directed to a matrix powder system for making a ceramic-metal composite and the composite made therefrom. The matrix powder system comprises one or more polycrystalline carbides, binderless carbides, or a combination thereof. The polycrystalline and/or binderless carbides comprise carbides of W, Ti, V, Cr, Nb, Mo, Ta, Hf, Zr, or a combination thereof. The matrix powder system may also contain additional ceramic phases and/or metals in addition to polycrystalline carbide and/or binderless carbide. The ceramic-metal composite comprises the inventive matrix powder system and a metal bond phase.

The present invention is also directed to a matrix bit body for an earth-boring drill bit made of this composite material. Alternatively, the matrix bit body may have a composite comprising polycrystalline carbide and/or binderless carbide matrix powder system on only a portion of its surface.

The present invention is also directed to a drill bit for oil and gas drilling comprising a drill bit body made of this composite material and at least one cutter.

BRIEF DESCRIPTION OF THE DRAWING(S)

FIGS. 2A and 2B are photomicrographs of binderless tungsten carbide infiltrated with a copper alloy; and FIGS. 2C and 2D are photomicrographs of tungsten carbide-cobalt pellets infiltrated with a copper alloy.

DESCRIPTION OF THE PREFERRED EMBODIMENT(S)

Figure 1:
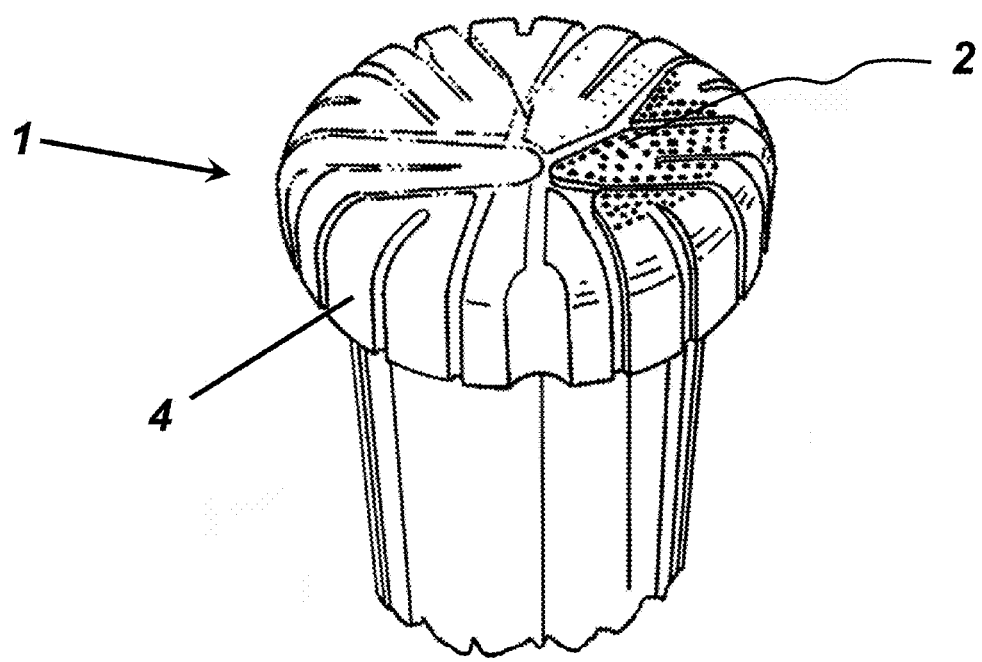
FIG. 1 is an isometric view of one embodiment of a drill bit according to the present invention.

The present invention is a matrix powder system comprising one or more polycrystalline carbides, binderless carbides, or a combination thereof. The polycrystalline and/or binderless carbides comprise carbides of W, Ti, V, Cr, Nb, Mo, Ta, Hf, Zr, or a combination thereof. The polycrystalline carbide is composed of multiple grains contained in a single particle. There is no binder in the polycrystalline carbide. The binderless carbide has 0-3 wt. % metal binder. The grain size of the carbides inside the polycrystalline carbide or binderless carbide is ≤15 μm, preferably ≤1 μm, and, more preferably, 0.2-0.6 μm.

Polycrystalline and binderless carbides are harder than cast, macrocrystalline, sintered, or agglomerate carburized carbides traditionally used in composite matrix bit bodies for drill bits for oil and gas drilling. Since hardness generally correlates with erosion resistance, these polycrystalline and binderless carbides also have improved erosion resistance as compared to the carbides traditionally used in the matrix bit bodies for drill bits for oil and gas drilling. In addition, these polycrystalline and/or binderless carbides have better thermal stability during manufacturing using an infiltration process than the carbides traditionally used for the matrix bodies of drill bits for oil and gas drilling. Therefore, in accordance with the present invention, in order to improve the erosion resistance of the matrix bit body, the matrix powder system includes one or more polycrystalline and/or binderless carbides.

The binderless carbides contain less than 3 wt. % metal binder selected from, but not limited to, W, Mo, Co, Ni, Ti, Cr, V, Fe, and Mn. Preferably, the binder phase is less than 0.5 wt. % and, more preferably, less than 0.2 wt. %.

The polycrystalline and/or binderless carbides are in the form of a powder which may be of any shape including, but not limited to, spherical, cubic, elliptical, cuboid, or irregular and may be between 0.005 mm (0.000197 in., 2500 mesh) and 1.19 mm (0.047 in., 16 mesh), preferably 0.02-0.42 mm, and, more preferably, 0.044-0.25 mm. Any combination of shapes and/or sizes of carbide powders may be used.

Such polycrystalline and/or binderless carbides may be made using a variety of processes including, but not limited to, rapid omni-directional compaction (ROC), hard hot isostatic pressing (hard HIP), microwave sintering, plasma sintering, and hot pressing of: 1) a metal powder and carbon powder mixture, 2) a metal carbide powder, or 3) a metal carbide powder and metal binder mixture. The resulting polycrystalline and/or binderless carbide may be crushed to obtain finer particles of the carbide material.

Polycrystalline and/or binderless tungsten carbides are particularly well suited for use in the matrix powder system due to their high hardness. Polycrystalline tungsten carbide is composed of pure tungsten carbide with multiple grains in one particle. There is no binder in polycrystalline tungsten carbide and tungsten carbide is the only phase. Binderless tungsten carbide has either 0-3 wt. % metal binder and/or up to 10 wt. % ditungsten carbide ($W_2C$). One such binderless tungsten carbide is described in U.S. patent application Ser. No. 12/700,991, incorporated herein by reference. Generally, binderless tungsten carbide is not a single phase except in its extreme condition of 0 wt. % metal binder or $W_2C$. The polycrystalline and/or binderless tungsten carbide used in the present invention may have a hardness of 1900 HV (0.5 kgf) or more, which far exceeds the hardness of the tungsten carbides traditionally used in matrix bit bodies as shown in Table 1.

TABLE 1

| Matrix Powder Component | Hardness HV(0.5 kgf) |
|---|---|
| Binderless tungsten carbide, crushed RT500 | 2941 ± 208 |
| Crushed cast tungsten carbide | 1943 ± 236 |
| Spherical cast tungsten carbide | 2498 ± 118 |

In addition to the one or more polycrystalline and/or binderless carbides, the matrix powder system may include an additional ceramic component comprising powders of carbides, nitrides, borides, and/or oxides. These additional ceramic powders include, but are not limited to, carbide, nitride, boride, or oxide powders traditionally utilized as matrix powder for composite matrix bit bodies. Such powders include cast tungsten carbide, macrocrystalline tungsten carbide, sintered tungsten carbide, agglomerate carburized tungsten carbide, carbides of Cr, Ta, Mo, V, Zr, Hf, Ti, and/or Nb, and/or refractory metal borides. The additional ceramic component may comprise 0-90 wt. % of the matrix powder system.

Optionally, a metal, introduced as a metal powder, may also be included in the matrix powder system. This metal powder may be Ni, Fe, Cu, Mn, P, Cr, Co, Si, B, Zn, Sn, or their alloys. The metal may comprise 0-15 wt. % of the matrix powder system and is present to enhance the bonding of the metal bond phase of the composite material to the ceramics present in the matrix phase of the composite material.

The invention also includes a composite comprising: (i) the matrix powder system and (ii) a metal bond phase. The metal bond phase bonds the particles of the matrix powder system together when melted in the infiltration process described herein and below. The metal bond phase comprises one or more of the following: Cu, Ni, Mn, Fe, Co, Al, Cr, Zn, Sn, Ag, B, Pb, Si, P, Ti, and Mg. Cu—Ni—Mn alloys (as described in U.S. Pat. Nos. 5,589,268, 5,733,649, and 5,733,664 which are hereby incorporated by reference), especially ones that are substantially free of zinc and tin (as described in United States Patent Application Publication No. 2008/0206585 which is hereby incorporated by reference) are particularly well suited as the metal bond phase for composite materials to be used for a matrix bit body for a drill bit for oil and gas drilling. The metal bond phase may additionally be heat-treatable to change the mechanical properties of the composite after solidification (as described in previously-cited United States Patent Application Publication No. 2008/0206585).

FIG. 1 shows one embodiment of a drill bit 1 having a drill bit body 4 of the inventive composite. To form such a drill bit 1 having a drill bit body 4 of the inventive composite, an infiltration process may be used. The matrix powder system comprising polycrystalline and/or binderless carbide powder and, optionally, one or more additional ceramic powders and/or metal powders is poured into a mold. The infiltration metal, which will become the metal bond phase of the composite, is then placed on top of the matrix powder system. The metal bond phase is generally a metal alloy, as described above, and may be in the form of a powder or in the form of larger pieces on the order of 6.3 mm (0.25 in.) to 12.7 mm (0.5 in.). After it is loaded, a top is positioned over the mold and the mold is heated in a furnace to a temperature above the melting point of the metal bond phase but below the melting point of the ceramic components of the matrix powder system. The metal bond phase melts and infiltrates the matrix powder system, thereby forming a drill bit body. After cooling and solidification, the infiltration metal bonds the matrix powder system together. A steel shank is either bonded to the drill bit body after solidification or placed in the mold prior to heating, such that the infiltrate metal bonds the shank to the drill bit body. The polycrystalline diamond cutters 2 are attached to the matrix bit body after solidification using brazing or another suitable attachment method to secure them in grooves or recesses formed in the matrix bit body by the mold.

The matrix powder system comprises 5-95 wt. % of the composite, preferably 20-85 wt. %, and, more preferably, 45-80 wt. %.

The polycrystalline and binderless carbides used in the present invention have higher thermal stability than traditional carbides used for drill bit bodies manufactured using the infiltration process. This is illustrated by the photomicrographs shown in FIGS. 2A-2D where it can be seen that after the infiltration process, tungsten carbide-cobalt pellets are penetrated by the infiltration metal and broken into much smaller pieces while the infiltrate metal does not penetrate the binderless tungsten carbide particles which remain intact.

To illustrate the improvement in erosion resistance achieved with the present invention, a comparative, traditional composite material for a matrix bit body was made using the infiltration process. The matrix powder system was 0.125-0.177 mm (0.0049-0.0070 in., 80-120 mesh) crushed cast tungsten carbide and the metal bond phase was by weight 53% Cu-24% Mn-15% Ni-8% Zn alloy. An inventive composite material was made in the same way except binderless tungsten carbide was substituted for the crushed cast tungsten carbide in the matrix powder system. The erosion volume loss, which should be minimized, was 0.18 cm$^3$ for the comparative composite and only 0.10 cm$^3$ for the inventive composite.

In addition, during the molding process, prior to placing the matrix powder system in the mold, a paste including one or more polycrystalline and/or binderless carbide powders and an organic binder, such as mineral oil may be applied to the inside of the mold. This layer of paste may cover the entire inside surface of the mold or may be applied in discrete areas corresponding to areas on the surface of the matrix bit body needing extra erosion resistance. The matrix powder system for the bulk of the matrix bit body is then poured into the mold on top of this paste and the process proceeds as described above. The organic binder is burned away during heating. The matrix powder system used for the bulk of the matrix bit body may be of a traditional composition or may be of the previously-described composition. After solidification, the areas on the surface of the matrix bit body corresponding to the areas where the paste was located in the mold will contain the polycrystalline and/or binderless tungsten carbide, making the erosion resistance in these areas different from the surrounding surface corresponding to areas in the mold where no paste was applied.

The paste may include one or more polycrystalline and/or binderless carbide powders and may be used with a matrix powder system for the bulk of the matrix bit body that also contains polycrystalline and/or binderless carbide as described above to form a matrix bit body. In this case, the areas on the surface of the matrix bit body corresponding to the areas where the paste was placed in the mold can be manufactured to have different types and/or amounts of polycrystalline and/or binderless carbide than surrounding areas and the bulk of the matrix bit body.

The paste may also include an additional ceramic phase of one or more carbide, nitride, boride, or oxide powders including, but not limited to, those traditionally used as the matrix powder of composite matrix bodies for drill bits. These include cast carbide, macrocrystalline carbide, sintered carbide, agglomerate carburized carbides, carbides of Cr, Ta, Mo, V, Zr, Hf, Ti, and/or Nb, and/or refractory metal borides.

Alternatively, during the molding process, prior to placing the matrix powder system in the mold, a face powder containing one or more polycrystalline and/or binderless carbide powders may be placed in the bottom of the mold. This layer of face powder may cover the bottom surface of the mold or may only cover discrete areas of the bottom of the mold corresponding to areas on the surface of the matrix bit body needing extra erosion resistance. The matrix powder system for the bulk of the matrix bit body is then poured into the mold on top of the face powder and the process proceeds as described above. The matrix powder system used for the bulk of the matrix bit body may be of a traditional composition or may be of the previously-described composition. After solidification, the areas on the surface of the matrix bit body corresponding to the areas where the face powder was located in the mold will contain the polycrystalline and/or binderless tungsten carbide making the erosion resistance in these areas different from the surrounding surface corresponding to areas in the mold where no face powder was applied.

The face powder may also include an additional ceramic phase of one or more carbide, nitride, boride, or oxide powders, including, but not limited to, those traditionally used as matrix powder in composite matrix bodies for drill bits. These include cast carbide, macrocrystalline carbide, sintered carbide, agglomerate carburized carbides, carbides of Cr, Ta, Mo, V, Zr, Hf, Ti, and/or Nb, and/or refractory metal borides.

Face powder is applied in a generally thicker layer in the mold than paste, forming a generally thicker surface layer on the finished matrix bit body. The surface layers formed by face powder or paste also generally have less strength than other parts of the matrix bit body because they are generally composed to provide maximum erosion protection. Thus, by using paste or face powder, the surface or a portion of the surface of the matrix bit body can be made of a composition that is more erosion resistant while the body can be made of a composition which has more strength.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A matrix bit body for a drill bit for oil and gas drilling wherein at least a portion of a surface thereof comprises a composite material comprising:
    a matrix powder system comprising one or more polycrystalline carbides, binderless carbides or a combination thereof dispersed in a metal bond phase; and
    wherein a bulk of the matrix bit body comprises a matrix powder system dispersed in a metal bond phase, the bulk matrix powder system comprising one or more polycrystalline carbides, binderless carbides or combinations thereof or the bulk matrix powder system comprising cast tungsten carbide, macrocrystalline tungsten carbide, sintered tungsten carbide, agglomerate carburized tungsten carbide, refractory metal borides or combinations thereof,
    wherein the binderless carbides of the composite material contain less than 0.5 wt. % binder; and
    wherein the composite material or the bulk matrix powder system or both comprises the binderless carbide wherein the binderless carbide contains tungsten and is a two phase carbide comprising up to 10 wt. % ditungsten carbide.

2. The matrix bit body of claim 1, wherein the composite material or the bulk matrix powder system or both comprises the one or more polycrystalline carbides, wherein the one or more polycrystalline carbides comprise a carbide of W, Ti, V, Cr, Nb, Mo, Ta, Hf, Zr, or a combination thereof.

3. The matrix bit body of claim 2 wherein grain sizes within a polycrystalline carbide particle are less than 15 μm.

4. The matrix bit body of claim 3, wherein the grain sizes are from 0.2 to 0.6 μm.

5. The matrix bit body of claim 1 wherein grains of the binderless carbide of the composite material or the bulk matrix powder system have a size of 15 μm or less.

6. The matrix bit body of claim 5, wherein the grains of the binderless carbide have a size from 0.2 to 0.6 μm.

7. The matrix bit body of claim 2 wherein the polycrystalline carbide contains tungsten and has a hardness of 1900 HV (0.5 kgf) or more.

8. The matrix bit body of claim 1 wherein the binderless carbide has a hardness of 1900 HV(0.5 kgf) or more.

9. The matrix bit body of claim 1, wherein the composite material or the bulk matrix powder system or both further comprises one or more additional ceramic phases selected from the group consisting of carbides, nitrides, borides, or oxides.

10. The matrix bit body of claim 9, wherein the one or more additional ceramic phases comprise one or more carbides selected from W, Cr, Ta, Mo, V. Zr, Hf, Ti, and Nb.

11. The matrix bit body of claim 1, wherein the bulk matrix powder system is formed of cast tungsten carbide, macrocrystalline tungsten carbide, sintered tungsten carbide, agglomerate carburized tungsten carbide, refractory metal borides or combinations thereof.

12. The matrix bit body of claim 1, wherein the matrix bit body is monolithic.

13. The matrix bit body of claim 1, wherein the metal bond phase of the bulk is continuous with the metal bond phase of the composite material.

\* \* \* \* \*